(12) United States Patent
Lossman et al.

(10) Patent No.: US 6,579,478 B2
(45) Date of Patent: Jun. 17, 2003

(54) PROGRESSIVE LENS APPARATUS AND PROCESS

(75) Inventors: Loren C. Lossman, Lewisville, TX (US); Larry H. Joel, Prospect, KY (US); James S. Carr, Highland Village, TX (US)

(73) Assignee: Q2100, Inc., Louisville, KY (US)

( * ) Notice: Subject to any disclaimer, the term of this patent is extended or adjusted under 35 U.S.C. 154(b) by 62 days.

(21) Appl. No.: 09/912,861

(22) Filed: Jul. 25, 2001

(65) Prior Publication Data

US 2002/0075446 A1 Jun. 20, 2002

(Under 37 CFR 1.47)

Related U.S. Application Data

(62) Division of application No. 09/522,796, filed on Mar. 10, 2000, now Pat. No. 6,284,159, which is a division of application No. 08/853,134, filed on May 8, 1997, now Pat. No. 6,105,925, which is a division of application No. 07/932,812, filed on Aug. 18, 1992, now Pat. No. 5,689,324.

(51) Int. Cl.$^7$ .............................................. B29D 11/00
(52) U.S. Cl. ....................................... 264/2.5; 264/219
(58) Field of Search ................................ 264/2.5, 1.36, 264/1.38, 219; 425/808

(56) References Cited

U.S. PATENT DOCUMENTS

| | | |
|---|---|---|
| 1,518,405 A | 12/1924 | Glancy |
| 2,878,721 A | 3/1959 | Kanolt |
| 3,687,528 A | 8/1972 | Maitenaz |
| 4,056,311 A | 11/1977 | Winthrop |
| 4,118,853 A | 10/1978 | Mignen |
| 4,274,717 A | 6/1981 | Davenport |
| 4,315,673 A | 2/1982 | Guilino et al. |
| 4,441,795 A | 4/1984 | Lobdell |
| 4,676,610 A | 6/1987 | Barkan et al. |
| 4,679,918 A | 7/1987 | Ace |
| 4,728,469 A | 3/1988 | Danner et al. |
| 4,861,153 A | 8/1989 | Winthrop |
| 4,879,318 A | 11/1989 | Lipscomb et al. |
| 4,919,850 A | 4/1990 | Blum et al. |
| 4,946,270 A | 8/1990 | Guilino et al. |
| 5,147,585 A | 9/1992 | Blum |
| 5,148,205 A | 9/1992 | Guilino et al. |
| 5,210,553 A | 5/1993 | Barth et al. |
| 5,270,744 A | 12/1993 | Portney |
| 5,270,745 A | 12/1993 | Pedrono |
| 5,364,256 A | 11/1994 | Lipscomb et al. |
| 5,406,341 A | 4/1995 | Blum et al. |
| 5,415,816 A | 5/1995 | Buazza et al. |
| 5,455,642 A | 10/1995 | Kato |

(List continued on next page.)

FOREIGN PATENT DOCUMENTS

| | | |
|---|---|---|
| EP | 0 314 417 | 5/1989 |
| FR | 1334376 | 7/1963 |
| FR | 2239427 | 5/1977 |
| GB | 876798 | 9/1961 |
| JP | 62 90053 | 4/1987 |
| WO | 89/11672 | 11/1989 |

OTHER PUBLICATIONS

Computer Patent Search (May 5, 1992–Jun. 30, 1992).
PCT Search Report mailed Dec. 22, 1993.

*Primary Examiner*—Mathieu D. Vargot
(74) *Attorney, Agent, or Firm*—Meyertons, Hood, Kivlin, Kowert & Goetzel, P.C.; Eric B. Meyertons

(57) ABSTRACT

A progressive lens mold, a method of making a progressive lens mold, and progressive lenses made using such mold or method. Back faces of progressive molds are preferentially tapered at their edges to reduce prism effects in lenses made using such molds. The tapering is accomplished by removing more of the back face adjacent the near portion vision zone of the mold versus the back face adjacent to the far vision zone of the molds.

51 Claims, 3 Drawing Sheets

U.S. PATENT DOCUMENTS

| | | |
|---|---|---|
| 5,488,442 A | 1/1996 | Harsigny et al. |
| 5,514,214 A | 5/1996 | Joel et al. |
| 5,516,468 A | 5/1996 | Lipscomb et al. |
| 5,529,728 A | 6/1996 | Buazza et al. |
| 5,550,600 A | 8/1996 | Ueno |
| 5,644,374 A | 7/1997 | Mukaiyama et al. |
| 5,689,324 A | 11/1997 | Lossman et al. |
| 5,771,089 A | 6/1998 | Barth |
| 6,000,798 A | 12/1999 | Chipman et al. |

PROGRESSIVE LENS APPARATUS AND PROCESS

This is a divisional of Ser. No. 09/522,796, filed Mar. 10, 2000, now U.S. Pat. No. 6,284,159, which is a divisional of Ser. No. 08/853,134, filed May 8, 1997, now U.S. Pat. No. 6,105,925, which is a divisional of Ser. No. 07/932,812, filed Aug. 18, 1992, now U.S. Pat. No. 5,689,324.

BACKGROUND OF THE INVENTION

1. Field of the Invention

This invention relates to molds used to cast plastic progressive eyeglass lenses, and to methods of making such molds. This invention also relates to lenses cast using these molds and methods.

2. Description of Related Art

Progressive eyeglass lenses typically include a front face, a back face, a near vision correction zone, a far vision correction zone, and a vision transition zone located between the near vision correction zone and the far vision correction zone. The front faces of these lenses are typically substantially convex, and back face of these lenses are typically substantially concave. These lenses are called "progressive" lenses because their power changes gradually and progressively (i.e., from the power of the near vision correction zone to the power of the far vision correction zone) in the vision transition zone. These lenses are generally preferred compared to ordinary or blended bifocal lenses because wearers of progressive lenses can focus on objects at near distances (by looking through the near vision correction zone), far distances (by looking through the far vision correction zone) and distances between near and far distances (by looking through different parts of the vision transition zone). Bifocal lenses only allow wearers to focus on objects at near and far distances since bifocal lenses only have a near vision correction zone and a far vision correction zone.

Molds used to cast progressive eyeglass lenses are hereinafter referred to as "progressive molds." These molds typically include a back face which is adapted to cast: (1) a near vision correction zone in the lower portion of a lens when worn, (2) a far vision correction zone in the upper portion of a lens when worn, and (3) a vision transition zone between the near and the far vision correction zones. Progressive molds are typically used to cure lens forming compositions to form lenses. They are typically used in combination with a second "back" companion mold and a gasket to form a mold cavity. In one embodiment the progressive mold and companion mold seal against opposite sides of the gasket to form the mold cavity. The mold cavity is then filled with a curable liquid composition, and the liquid composition is cured to a solid by exposure of the composition to light or heat.

Plastic eyeglass lenses are typically cured in the form of a lens "blank" which is close to, but generally not identical to, the prescription needed by the lens wearer. This blank must be further shaped (e.g. cut, beveled, or ground) to closely fit specific customer prescriptions. This final "prescription shaping" may be completed in a retail environment, or a wholesale laboratory environment.

Recently new methods have been developed for preparing lenses by casting lens-forming compositions between glass molds such that the cast lenses fit specific wearer prescriptions. These cast lenses do not require "prescription shaping" since they are cast to meet the final prescription needs of the wearer. The lens-forming compositions in these processes may be cured by exposure to ultraviolet light or heat, or by any free radical polymerization process. Ultraviolet light processes are adaptable to produce lenses in time periods of less than one hour. As a result, lenses can be directly cast, without further shaping, to fit customer prescriptions and still provide quick service. Some of such curing techniques are described in the U.S. patents and co-pending applications described below:

co-pending U.S. application entitled "Apparatus and Process For Lens Curing and Coating" by Buazza et al., filed the same day as this application, and which is a continuation-in-part of co-pending U.S. application Ser. No. 800,561, filed Dec. 6, 1991, which is a continuation-in-part of co-pending U.S. application Ser. No. 642,614, filed Jan. 17, 1991, which is a continuation-in-part of co-pending U.S. application Ser. No. 425,371, filed Oct. 26, 1989, which is a continuation-in-part of Ser. No. 273,428, filed Nov. 18, 1988, now U.S. Pat. No. 4,879,318, which is a continuation-in-part of Ser. No. 021,913, filed Mar. 4, 1987, now abandoned, which is a continuation-in-part of Ser. No. 823,339, filed Jan. 28, 1986, now U.S. Pat. No. 4,728,469.

These patents and co-pending applications are incorporated by reference. In addition, U.S. Pat. No. 4,919,850 also describes methods and apparatus for making plastic lenses, and this patent is also incorporated by reference.

Progressive molds may be made using a variety of methods well known in the art such as grinding. Grinding progressive molds, however, can be unduly expensive and difficult due to the uneven back face of the mold. An alternate method to make progressive molds is a "heat slumping" process. This process is preferred by some manufacturers for preparing progressive molds because it is relatively less expensive than other processes such as grinding.

When making progressive molds using a heat slumping process, a first or prototype surface may be prepared which is a replica of the front face of the progressive lens desired. This first surface may be concave or convex, and typically comprises a ceramic material. After the first surface has been prepared, mold material is placed over this first surface. Typically this mold material is made of glass and is shaped in the form of a disk. The mold material and the first surface are then heated to a high enough temperature such that the mold material "slumps" or molds around the first surface, thereby forming a progressive mold with a back face substantially similar to the front face of the lens desired. The resulting mold also has a front face, and side surfaces connecting the front face to the back face. The mold is then removed from the first surface.

Whether made by grinding, heat slumping, or other processes, one problem with nearly all existing progressive molds is that they tend to cast lenses that have "vertical prism" effects. If uncorrected, vertical prism effects cause wearers of such lenses to see images at different vertical levels than the images really are (i.e., the lenses tend to cause the wearer's vision to shift slightly in the vertical direction). Wearers of lenses with pronounced vertical prism imbalance tend to experience diplopia (double vision), nausea, and/or suffer headaches. Vertical prism effects are believed to be caused by excessive differential thicknesses between the near and far vision correction zones in progressive lenses. Specifically, the bottom of the lens proximate the near vision zone is thicker than the top of the lens proximate the far vision correction zone. If the amount of thickness difference is excessive, it may cause an unacceptably large amount of (base down) vertical prism effects.

Vertical prism effects exist but are relatively easily corrected in progressive lens blanks. The correction takes place when the lens blanks undergo prescription shaping. The prescription shaping process usually involves applying a shaping instrument (such as a grinder) to the center of the concave surface of the lens. To hold the lens blank in place, the convex surface of the lens blank is attached to a lens "block." This lens block is attached to the geometric center of the convex surface of the lens blank. Any desired prism effect correction is made by inserting a "prism ring" around the block such that it can seat against the lens blank. The prism ring is designed to tilt the lens blank the appropriate amount necessary to increase or decrease vertical prism effects in the lens blank when the lens blank is shaped to prescription. The tilting caused by the prism ring also affects the thickness of the edges of the resulting lens. Sometimes practitioners will vary the vertical prism effects (i.e. by varying the prism ring tilt) in an effort to cosmetically optimize lens edges. This process is well known in the art.

Vertical prism effects are more difficult to treat with lenses that cast to prescription since these lenses do not undergo a prescription shaping process. Thus vertical prism effects remain in these lenses unless other-measures are taken to reduce or eliminate them. These measures are the subject of the invention described herein.

SUMMARY OF THE INVENTION

In a general aspect, the present invention includes a system to reduce vertical prism effects in prescription lenses cast using progressive molds. In another aspect, the invention includes a mold for casting prescription progressive lenses with reduced vertical prism effects. The invention also includes progressive lenses made by the system of the invention.

In a more specific aspect, the invention is directed to a progressive mold disk with a front face, and a back face which is concave and tracks the convex front face of a lens desired to be cast with the mold. The mold disk is bounded by a generally cylindrical surface which joins the front and back faces. In addition, the back face has a relatively narrow annular surface or band which extends around its outer edge or periphery. This annular surface or band is relatively flat and extends between the outer boundary of the concave portion of the back face and the outer boundary of the back face itself. The width of the band varies around the periphery of the back face. It is usually widest at the portion of the back face corresponding to the bottom of the near vision correction zone of a lens formed by the mold. It is narrower at the portion of the back face corresponding to the top of the far vision correction zone of a lens formed by the mold. In general, these two extreme portions of the band are both wider than the remaining intermediate portions.

A key feature of the mold component of the invention resides in the formation of the annular surface or band around the edge of the back face. This surface or band is formed by tapering the back face of the mold at a "correction" angle such that more of the back face near the bottom of the near vision correction zone is removed versus the back face near the top of the far vision correction zone. The surface or band near the bottom of the near vision correction zone thus tapers or slopes slightly inward and towards the center of the mold. The surface or band near the top of the far vision correction zone tapers or slopes slightly inward and away from the center of the mold. The angle of taper or slope corresponds to the correction angle.

An advantage of the invention is that vertical prism effects can be corrected in cast prescription lenses without modifying the gasket or the molds used to cast the back face of such lenses (i.e. the "back molds"). As a result, several different prescription progressive lenses can be cast using identical gaskets and back molds. In such case, often only the progressive molds themselves need to be varied to make different progressive lenses.

DETAILED DESCRIPTION OF PREFERRED EMBODIMENTS

Figure 2:
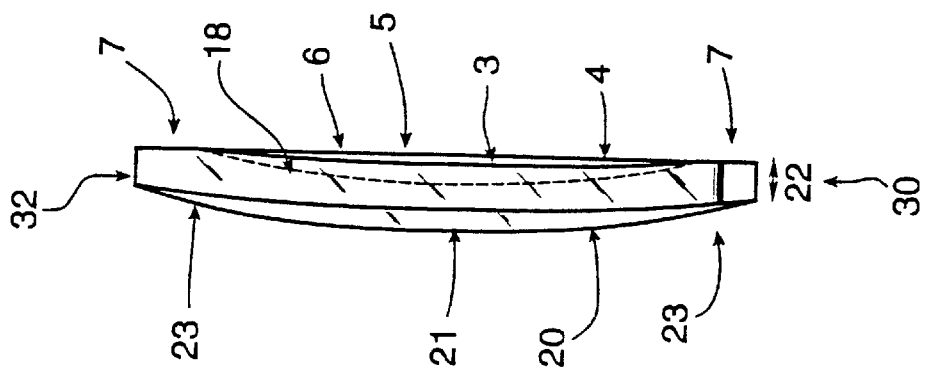
FIG. 2 depicts a side view of the mold shown in FIG. 1.
Figure 1:
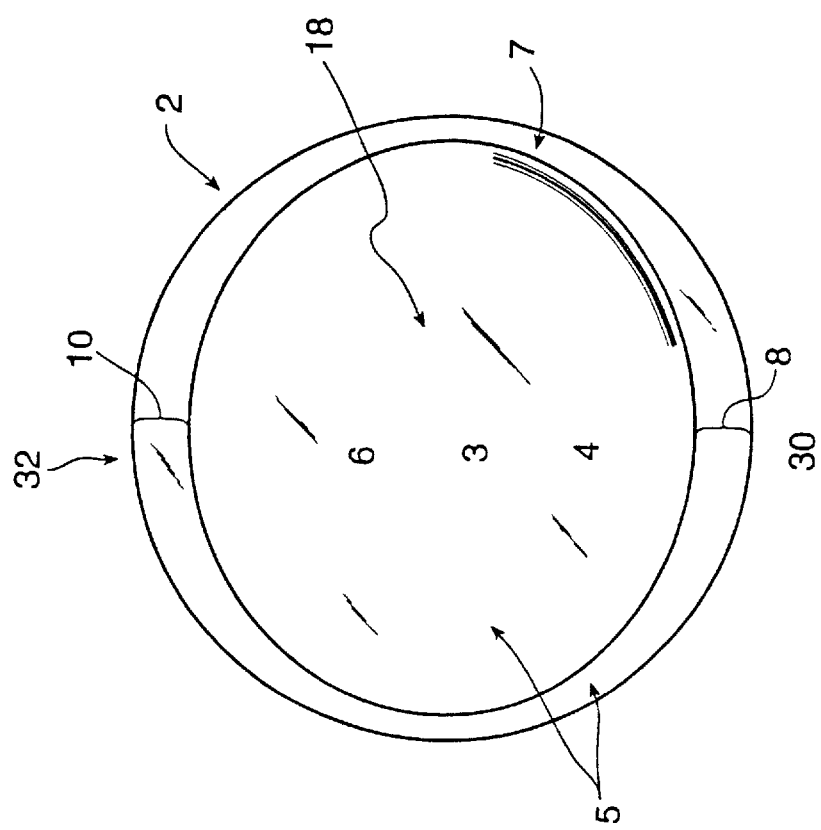
FIG. 1 schematically depicts a top view of a progressive mold of the invention with a front face and a back face. The back face of this mold is facing upwards.

FIG. 1 schematically depicts a progressive mold 2 which is adapted to cast a progressive plastic eyeglass lens according to the method of the invention. Like all the figures, FIG. 1 is not an exact representation of a progressive mold 2. FIG. 1 is instead only intended to depict various important features of the invention. The mold 2 typically includes a back face 5 which includes a section adapted to cast a near vision correction zone 4, a section adapted to cast a far vision correction zone 6, and a section adapted to cast a vision transition zone 3. As shown in FIGS. 1 and 2, the mold 2 may be disk-shaped, however it is to be understood that other shapes such as ovals, squares, and rectangles are also possible.

The back face 5 of mold 2 typically includes a generally flat surface or band 7 and a substantially concave surface 18. The width of band 7 may vary around the circumference of mold 2, however it tends to be wider near the bottom 30 and top 32 of the mold 2. Specifically, band 7 may have a width 8 when at the bottom 30 and a width 10 when at the top 32. Band 7 is advantageous in that it provides a surface for gaskets to seal against the mold, thus forming a mold cavity for lens casting.

FIG. 2 depicts the mold 2 as viewed from the side. The mold 2 typically includes a convex front face 20 with a side surface 22. Side surface 22 is drawn to be substantially flat, however it is to be understood that this surface 22 may also be in other shapes such as irregular, convex, or concave shapes. The center 21 of the mold 2 may be thinner or thicker than the thickness of the mold 2 at various radii 23 from the center 21. Although not clearly shown in FIG. 2, it is to be understood that band 7 angles inward and toward center 21 at the bottom 30, and inward and away from center 21 at top 32.

Figure 3:
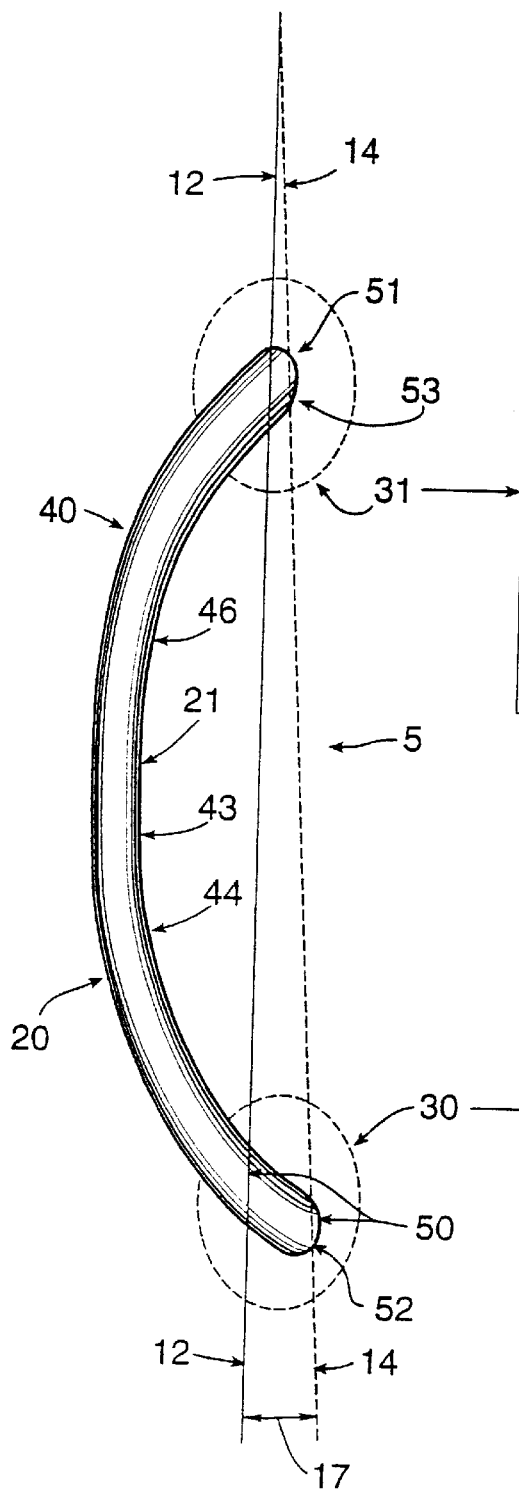
FIG. 3 depicts a schematic diagram of a mold being formed according to method of the invention.
Figure 5:
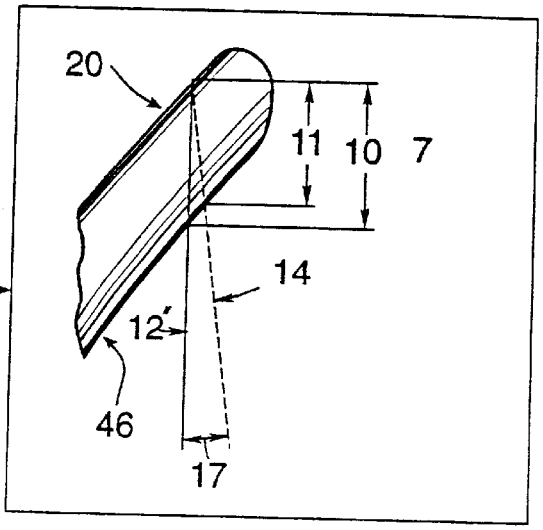
FIG. 5 depicts an enlargement of portion 31 in FIG. 3.
Figure 4:
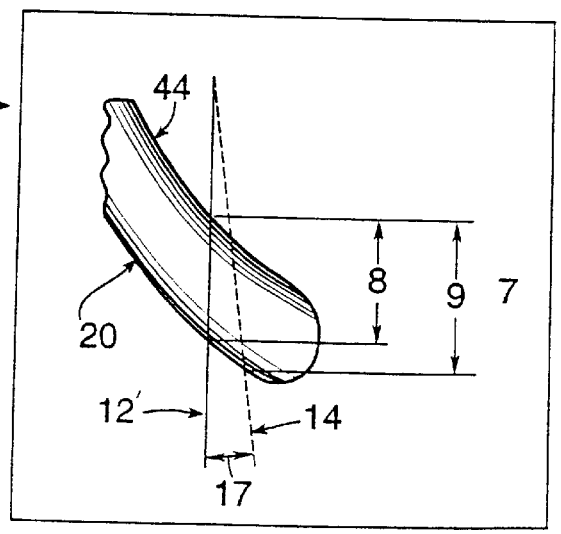
FIG. 4 depicts an enlargement of portion 30 in FIG. 3.

FIG. 3 is a schematic drawing depicting the method of the invention. As discussed above, progressive molds may be formed by a variety of processes known in the art. Mold 40 in FIG. 3 depicts a mold that has been made according to any one of these processes. The mold 40 includes a back face 5 shaped to include a section adapted to cast a near vision correction zone 44, a section adapted to cast a far vision correction zone 46, and a section adapted to cast a vision transition zone 43. FIGS. 4 and 5 represent enlarged portions 30 and 31 in FIG. 3, with the exception that FIGS. 4 and 5 do not include sections 50–53 (see description below).

Mold 40 may not initially include a flat surface or band such as band 7 in FIG. 1. To provide such a band, mold 40 is typically tapered by applying it to a cutting or grinding surface. This surface may be substantially flat or slightly convex. This tapering removes mold 40 sections 50 and 51, thus forming band 7 with a width 8 near the bottom of the mold and width 10 near the top of the mold. As shown in FIG. 3, in a typical process mold 40 is applied substantially evenly to the cutting or grinding surface. Typically sections 50 and 51 are approximately the same size. If sections 50 and 51 are cut from mold 40, then line 12 in FIG. 3 represents the point at which the sections 50 and 51 are severed from the mold 40. If sections 50 and 51 are ground from mold 40, then line 12 in FIG. 3 represents the point to which mold 40 is ground to remove sections 50 and 51. It is to be understood that sections 50 and 51 in FIG. 3 are only schematically drawn, and the size of these sections can vary depending on the width of band 7 and other factors. Mold 40 could be tapered according to lines parallel and to the right or left of line 12, thereby making sections 50 and 51 smaller or larger. For instance, lines 12' and 12" in FIGS. 4–5 represent lines parallel and to the right of line 12 in FIG. 3.

Tapering mold 40 as described above provides the mold 40 with a band 7 which can act as a sealing surface when the mold 40 is used to form a mold cavity to cast lenses. This tapering, however, does not reduce the vertical prism effects described above.

The method of the invention involves shaping the back face 5 of the progressive mold 40 so that vertical prism effects are reduced. The method of the invention may be accomplished by tapering the edges of the back face 5 so that the average thickness of near vision zones in lenses cast by the mold 40 is thinned. This may be accomplished by disproportionately tapering the edges of the back face 5 of the mold 40 so that the amount of the back face 5 removed from the edges of the back face 5 adjacent the near vision correction zone 44 is larger than the amount of back face 5 removed from the edges of the back face 5 adjacent the far vision correction zone 46. The tapering has a more dramatic effect on the thickness of the edges of lenses cast by the mold versus the effect of thickness near the center of lenses cast by the mold. In other words, the tapering thins the resultant lenses in varying amounts, with the thinning being greatest near the edges of the near vision zone.

As shown in FIGS. 3–5, the method of the invention may be accomplished by shaping the back face 5 of the mold 40 by tapering it at an angle 17 such that the amount of back face 5 proximate to the near vision zone 4 which is tapered is greater than the amount of back face 5 proximate to the far vision correction zone 6 which is tapered. As shown in FIG. 3, line 14 represents the point to which mold 40 is tapered to remove sections 52 and 53, thereby forming band 7 with a width 9 near the bottom of the mold and width 11 near the top of the mold. As shown in FIG. 3, in the method of the invention the mold 40 is applied unevenly to the tapering surface. Thus sections 52 and 53 are not the same size. If sections 52 and 53 are cut from mold 40, then line 14 in FIGS. 3–5 represents the point at which the sections 52 and 53 are severed from the mold 40. If sections 52 and 53 are ground from mold 40, then line 14 in FIGS. 3–5 represents the point to which mold 40 is ground to remove sections 52 and 53. It is to be understood that sections 52 and 53 in FIGS. 3–5 are only schematically drawn, and the size of these sections can vary depending on the width of band 7 desired and other factors. For instance, mold 40 could be tapered according to lines parallel and to the right or left of line 14, thereby making sections 52 and 53 smaller or larger.

As shown in FIG. 4, when section 52 is removed, part of the near vision correction zone 44 of the back face 5 may also be removed. Thus, as shown in FIG. 4, width 8 usually changes to width 9 when the mold 40 is tapered according to the method of the invention. Depending on system variables (e.g. mold thickness, angle 17, where line 14 is placed, etc.), increasing the size of section 52 thus usually increases the width of band 7. It is to be understood, however, that in some circumstances increasing the size of section 52 may not affect, or even decrease, the width of band 7 (if, for example, the mold had a constant thickness, and angle 17 was significantly decreased at the same time that line 14 was moved to the left on FIG. 3). Generally speaking, the size of section 52 can be increased by increasing angle 17, and/or by moving line 14 to the left on FIGS. 3–5.

As shown in FIG. 5, when section 53 is removed, part of the far vision correction zone 46 of the back face 5 may also be removed. As such, width 10 may be increased or decreased to width 11. In FIG. 5 width 11 is shown as larger than width 10, however it is to be understood that width 11 can also be the same as or smaller than width 10 depending on system variables.

Generally speaking, as width 9 is increased, larger portions of the near vision correction zone 44 are removed. Similarly, as width 10 is increased, larger portions of the far vision correction zone 46 are removed. Widths 9 and 11 should be small enough to prevent an excessive amount of near vision correction zone 44 or far vision correction zone 46 being removed. If too much near vision zone 44 or far vision correction zone 46 is removed, then the mold will produce a lens with either a near or far vision correction zone that is unduly small and commercially unsalable. Correspondingly, if widths 9 and 11 are too small, then gaskets used to cast lenses will not seal against band 7 to hold liquid lens-forming compositions in mold cavities formed in part by the mold and such gaskets. In a preferred embodiment, widths 9 and 11 are in the range of about 1 to 10 millimeters, and more preferably is about 2 to 8 millimeters, and more preferably still is about 3 to 6 millimeters.

As shown in FIG. 4, after section 52 is removed, the portion of band 7 proximate to the near vision correction zone is angled inward and towards the center 21 at angle 17. As shown in FIG. 5, after section 53 is removed, the portion of band 7 proximate to the far vision correction zone is angled inward and away from the center 21 at angle 17. Angle 17 is preferably between 0.25 and 10 degrees, more preferably between 0.25 and 5 degrees, and more preferably still between 0.25 and 2 degrees. In preferred embodiments, the angle 17 was 0.5, 0.75, and 1.0 degrees. The amount of angle 17 is limited by desired limits of widths 9 and 11. For instance, as angle 17 increases, then width 9 usually also increases.

Figure 6B:
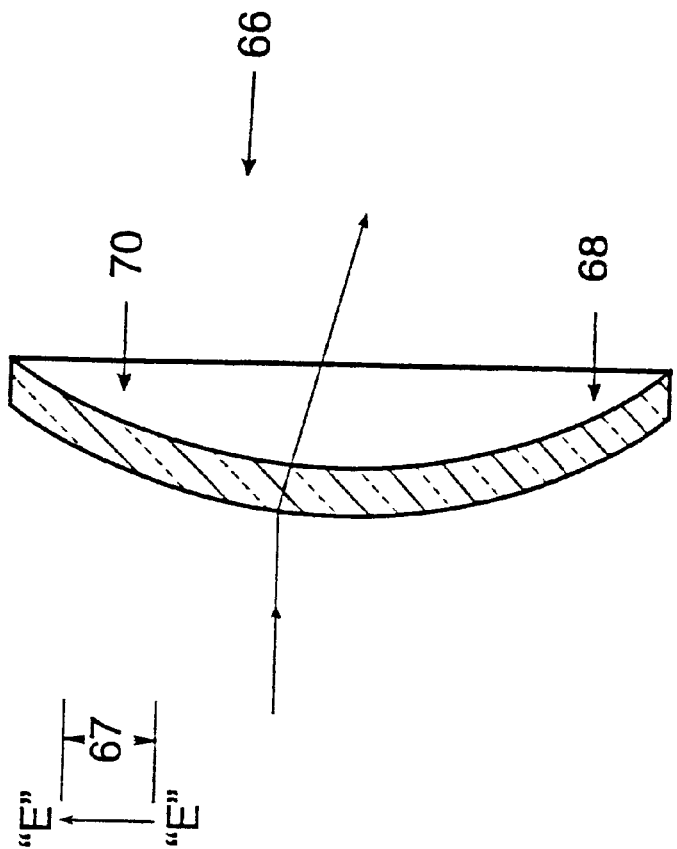
FIGS. 6A and 6B depict lenses made by uncorrected and corrected progressive molds.
Figure 6A:
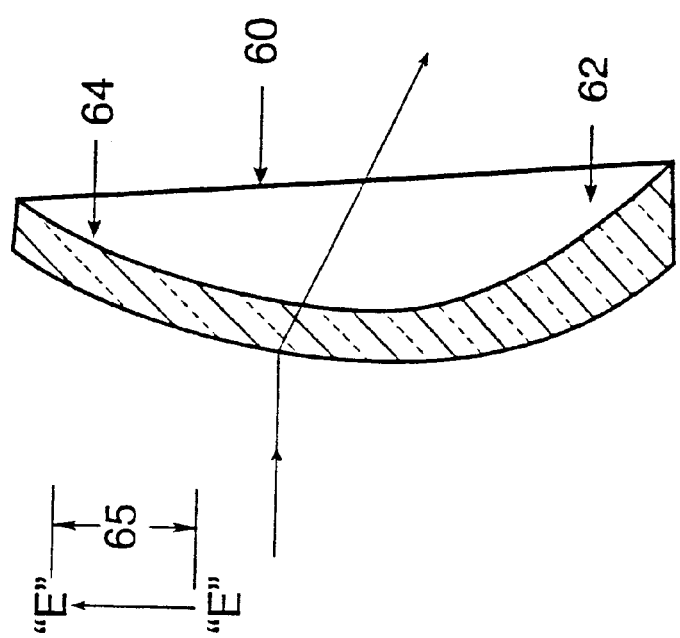

FIG. 6A depicts a lens 60 that has been cast by a mold that was not corrected according to the method of the invention. As shown in FIG. 6A, the lens 60 has a near vision correction zone thickness 62 that is thicker than the far vision zone thickness 64. As a result, vertical image displacement 65 (i.e. vertical prism effects) resulted. FIG. 6B depicts the same prescription lens from FIG. 6A wherein that lens now has been cast by a mold that was corrected according to the method of the invention. As shown in FIG. 6B, the lens 66 has a near vision correction zone thickness 68 that is still thicker than the far vision correction zone thickness 70, however thickness 68 is now closer to thickness 70. As a result, vertical image displacement 67 (i.e.

vertical prism effects) resulted. As shown in FIGS. 6A and 6B, vertical image displacement 67 is less than vertical image displacement 65, indicating that the vertical prism effects in lens 66 are less than they are in lens 60.

EXAMPLES

Glass progressive molds that are prepared using a slump molding process are available from Shamir Optical Industries (Kibbutz Shamir, Upper Galilee, Israel). Glass progressive molds received from Shamir were tested to determine the amount of vertical prism effects present in lenses cast using such molds. These molds were disk-shaped, and were approximately 80 millimeters in diameter and 3.2–4.0 millimeters thick. The molds were used to cast lenses with ultraviolet light as described in the U.S. patent applications entitled "Apparatus and Process For Lens Curing and Coating" by Buazza et al., filed the same day as this application, and which is a continuation-in-part of U.S. application Ser. No. 800,561, filed Dec. 6, 1991. It is possible to cast lenses using other apparatus and methods known in the art. Various molds were tested both before and after they were prepared according to the method of the invention.

Table 1 summarizes the results. Column 1 in Table 1 shows the mold reference base, in diopters ("D"), of the far vision correction zone in lenses prepared with various molds (hereinafter "mold reference base"). Column 2 in Table 1 shows the amount of power added to near vision correction zones over and above the mold reference bases (hereinafter "add power"). Column 3 of Table 1 shows the amount of vertical prism, in prism diopters ("ΔD"), of lenses prepared with molds that were uncorrected according to the method of the invention. Vertical prism effects were measured at the geometric center of each lens. Column 4 in Table 1 shows the amount of vertical prism of lenses prepared with molds that were corrected according to the method of the invention. Again, vertical prism effects were measured at the geometric center of each lens. Column 5 in Table 1 shows width 9 of the corrected molds in millimeters ("mm").

TABLE 1

| 1 Mold Reference Base (D) | 2 Add Power (D) | 3 Prism in Lens Made by Uncorrected Mold (ΔD) | 4 Prism in Lens Made by Corrected Mold (ΔD) | 5 Width 9 of Corrected Molds (mm) |
|---|---|---|---|---|
| +6.00 | +1.00 | 0.75 | .75 | N/A |
| +6.00 | +1.25 | 0.87 | .87 | N/A |
| +6.00 | +1.50 | 1.00 | 1.00 | N/A |
| +6.00 | +1.75 | 1.25 | 1.25 | N/A |
| +6.00 | +2.00 | 1.50 | 1.50 | N/A |
| +6.00 | +2.25 | 1.62 | 1.25 | 4.0 |
| +6.00 | +2.50 | 1.75 | 1.37 | 4.5 |
| +6.00 | +2.75 | 2.00 | 1.50 | 5.0 |
| +6.00 | +3.00 | 2.25 | 1.50 | 5.5 |
| +4.00 | +1.00 | 0.75 | .75 | N/A |
| +4.00 | +1.25 | 0.87 | .87 | N/A |
| +4.00 | +1.50 | 1.00 | 1.00 | N/A |
| +4.00 | +1.75 | 1.25 | 1.25 | N/A |
| +4.00 | +2.00 | 1.50 | 1.50 | N/A |
| +4.00 | +2.25 | 1.62 | .75 | 5.0 |
| +4.00 | +2.50 | 1.75 | 1.00 | 5.5 |
| +4.00 | +2.75 | 2.00 | 1.25 | 6.0 |
| +4.00 | +3.00 | 2.25 | 1.50 | 6.5 |
| +3.00 | +1.00 | 0.75 | .75 | N/A |
| +3.00 | +1.25 | 0.87 | .87 | N/A |
| +3.00 | +2.00 | 1.50 | 1.50 | N/A |
| +3.00 | +2.25 | 1.62 | 1.00 | 6.0 |
| +3.00 | +2.50 | 1.75 | 1.0 | 7.0 |
| +3.00 | +2.75 | 2.00 | 1.12 | 7.5 |
| +3.00 | +3.00 | 2.25 | 1.12 | 8.0 |

As shown in Column 4, molds that were corrected according to the method of the invention produced lenses with reduced vertical prism effects in the far vision correction zones of these lenses. The amount of reduction tended to increase as the angle of correction increased. In addition, as the angle of correction was increased, then the width 9 increased, thus reducing the amount of near vision correction zone. Thus the amount of the angle of correction is limited by the amount of near vision correction zone in resultant lenses that can be acceptably reduced.

Optimally lens vertical prism effects are zero. If the vertical prism effects in a single lens is greater than 1.5 ΔD, then wearers may suffer headaches, nausea, and loss of visual function. As shown in Table 1, unacceptably high vertical prism effects (i.e., greater than about 1.5 ΔD) tend to be produced in higher add power lenses made with uncorrected molds. Thus some correction of vertical prism effects was necessary in higher add power lenses. The term "N/A" in Column 5 means that no correction was applied since the molds already produced lenses with less than 1.5 ΔD of vertical prism effects (thus width 9 did not differ from width 8).

If the vertical prism imbalance between lenses in a pair of glasses is greater than 0.5 ΔD, then wearers may suffer headaches and nausea. Advantageously the amount of vertical prism effects differ no more than about 0.33 prism diopter between right and left lenses in a pair of glasses (ANSI Z80.1-Apr. 15, 1991). More preferably, this difference is less than about 0.12 prism diopter. If the vertical prism effects difference between lenses in a pair of glasses is too much, then the wearer may also tend to experience diplopia (i.e. see double) because the wearer tends to have difficulty merging images. Thus the method of the invention can be used to optimize vertical prism effects.

The results shown in Columns 4–5 in Table 1 were obtained empirically by experimenting with various angles of correction applied to mold holding devices. The holding device was locked into place when a certain angle of correction was applied to it such that molds prepared with the device cast lenses with less than about 1.5 ΔD with a given mold reference base and add power combination. The actual angles of correction for each locked position was not recorded, but is estimated to be preferably about 0–2 degrees, more preferably about 0.25 to 1.0 degrees, and more preferably still 0.5 degrees. Different mold holding devices were locked into place for different mold reference base and add power combinations. It has been found that it is possible to prepare a locked holding device for each mold reference base and add power combination. In this manner different holding devices can be used for different mold reference base and add power combinations instead of using the same holding device with a varied angle of correction.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the following claims.

What is claimed is:

1. A method of making a mold adapted to cast a progressive plastic eyeglass lens with a front face, a back face, a near vision correction zone, a far vision correction zone, and a vision transition zone between the near vision correction zone and the far vision correction zone, comprising the steps of:
    forming a progressive mold comprising (i) a back face with edges that is adapted to cast the front face of the lens, and wherein the back face of the mold comprises a near vision correction zone adapted to cast the near vision correction zone of the lens, a far vision correction zone adapted to cast the far vision correction zone of the lens, and a transition vision correction zone adapted to cast the transition vision correction zone of the lens, (ii) a front face, and (iii) side surfaces connecting the front face to the back face; and
    shaping the peripheral edges of the back face of the mold proximate to the near vision zone of the mold sufficiently to reduce vertical prism effects otherwise associated in a lens cast by the mold.

2. The method of claim 1 wherein the shaping is accomplished by tapering the edges of the back face of the mold such that the average thickness of the near vision correction zone of a lens cast by the mold is thinned by an amount that is more than an amount that the average thickness of the far vision correction zone of such lens is thinned.

3. The method of claim 2 wherein the tapering is disproportionate so that the amount of the back face removed from the edges of the back face proximate to the near vision correction zone is larger than the amount of back face removed from the edges of the back face proximate the far vision correction zone.

4. The method of claim 2 wherein the tapering is accomplished by grinding or cutting the mold.

5. The method of claim 1, further comprising the step of shaping the mold such that the back face comprises a substantially flat band which connects from the edges of the back face to edges of the concave surface in the back face.

6. The method of claim 5 wherein the width of the band is about 0.5 to 10 millimeters when measured from the edges of the back face to the edges of the concave surface.

7. The method of claim 5 wherein the width of the band is about 2.0 to 8 millimeters when measured from the edges of the back face to the edges of the concave surface.

8. The method of claim 5 wherein the concave surface has a center, and wherein the band adjacent the near vision correction zone is angled inward and towards the center of the concave surface.

9. The method of claim 8 wherein the angle is from about 0.25 to 10 degrees.

10. The method of claim 8 wherein the angle is from about 0.25 to 5 degrees.

11. The method of claim 1 wherein the back face is shaped by tapering at an angle such that the amount of back face adjacent the near vision correction zone which is removed is more than the amount of back face adjacent the far vision correction zone which is removed.

12. The method of claim 11 wherein the angle is from about 0.25 to 10 degrees.

13. The method of claim 11 wherein the angle is from about 0.25 to 5 degrees.

14. The method of claim 1 wherein the mold comprises glass.

15. The method of claim 1 wherein the mold is substantially disk-shaped.

16. The method of claim 5 wherein a width of the band varies, the width being measured from the edges of the back face to the edges of the concave surface.

17. The method of claim 5, wherein the concave surface has a center, and wherein the band adjacent the near vision correction zone is angled inward and away from the center of the concave surface.

18. The method of claim 1, wherein the mold is substantially oval shaped.

19. The method of claim 1, wherein the side surfaces are substantially flat.

20. The method of claim 1, wherein the side surfaces are substantially concave.

21. The method of claim 1, wherein the side surfaces are substantially convex.

22. The method of claim 1, wherein the mold is configured to form an eyeglass lens having a first power, and wherein the mold is configured to form an eyeglass lens having a second power.

23. The method of claim 1, wherein the mold transmits light having a wavelength substantially greater than about 300 nm.

24. The method of claim 1, wherein a center area of the mold is substantially thicker than the rest of the mold.

25. The method of claim 1, wherein a center area of the mold is substantially thinner than the rest of the mold.

26. The method of claim 5, wherein the concave surface has a center, and wherein the band adjacent the near vision correction zone is angled inward and away from the center of the concave surface.

27. A method of making a mold adapted to cast a progressive plastic eyeglass lens, comprising:
    forming a progressive mold comprising:
        a back face with edges that are adapted to cast the front face of the lens, wherein the back face of the mold comprises:
            a near vision correction zone adapted to cast the near vision correction zone of the lens;
            a far vision correction zone adapted to cast the far vision correction zone of the lens;
            a transition vision correction zone adapted to cast the transition vision correction zone of the lens; and
            a band coupling the edges of the back face to the edges of a concave surface positioned in the back face;
        a front face; and
        side surfaces connecting the front face to the back face;
    shaping the peripheral edges of the back face of the mold proximate to the near vision zone of the mold sufficiently to reduce vertical prism effects otherwise associated in a lens cast by the mold; and
    shaping the mold such that the back face comprises a substantially flat band which connects from the edges of the back face to edges of the concave surface in the back face.

28. The method of claim 27, wherein the shaping is accomplished by tapering the edges of the back face of the mold such that the average thickness of the near vision correction zone of a lens cast by the mold is thinned by an amount that is more than an amount that the average thickness of the far vision correction zone of such lens is thinned.

29. The method of claim 28, wherein the tapering is disproportionate so that the amount of the back face removed from the edges of the back face proximate to the near vision correction zone is larger than the amount of back face removed from the edges of the back face proximate the far vision correction zone.

30. The method of claim 28, wherein the tapering is accomplished by grinding or cutting the mold.

31. The method of claim 27, wherein the width of the band is about 0.5 to 10 millimeters when measured from the edges of the back face to the edges of the concave surface.

32. The method of claim 27, wherein the width of the band is about 2 to 8 millimeters when measured from the edges of the back face to the edges of the concave surface.

33. The method of claim 27, wherein the concave surface has a center, and wherein the band adjacent the near vision correction zone is angled inward and towards the center of the concave surface.

34. The method of claim 33, wherein the angle is from about 0.25 to 10 degrees.

35. The method of claim 33, wherein the angle is from about 0.25 to 5 degrees.

36. The method of claim 27, wherein the back face is shaped by tapering at an angle such that the amount of back face adjacent the near vision correction zone which is removed is more than the amount of back face adjacent the far vision correction zone which is removed.

37. The method of claim 36, wherein the angle is from about 0.25 to 10 degrees.

38. The method of claim 36, wherein the angle is from about 0.25 to 5 degrees.

39. The method of claim 27, wherein the mold comprises glass.

40. The method of claim 27, wherein the mold is substantially disk-shaped.

41. The method of claim 27, wherein a width of the band varies, the width being measured from the edges of the back face to the edges of the concave surface.

42. The method of claim 27, wherein the concave surface has a center, and wherein the band adjacent the near vision correction zone is angled inward and away from the center of the concave surface.

43. The method of claim 27, wherein the mold is substantially oval shaped.

44. The method of claim 27, wherein the side surfaces are substantially flat.

45. The method of claim 27, wherein the side surfaces are substantially concave.

46. The method of claim 27, wherein the side surfaces are substantially convex.

47. The method of claim 27, wherein the mold is configured to form an eyeglass lens having a first power, and wherein the mold is configured to form an eyeglass lens having a second power.

48. The method of claim 27, wherein the mold transmits light having a wavelength substantially greater than about 300 nm.

49. The method of claim 27, wherein a center area of the mold is substantially thicker than the rest of the mold.

50. The method of claim 27, wherein a center area of the mold is substantially thinner than the rest of the mold.

51. The method of claim 27, wherein the concave surface has a center, and wherein the band adjacent the near vision correction zone is angled inward and away from the center of the concave surface.

* * * * *